United States Patent
Chen et al.

(10) Patent No.: US 8,588,779 B2
(45) Date of Patent: Nov. 19, 2013

(54) WIRELESS COMMUNICATION SYSTEM, COMMUNICATION DEVICE AND BASE STATION THEREOF

(75) Inventors: Yung-Han Chen, Hsinchu (TW); Fang-Ching Ren, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 292 days.

(21) Appl. No.: 12/940,061

(22) Filed: Nov. 5, 2010

(65) Prior Publication Data

US 2011/0111755 A1    May 12, 2011

Related U.S. Application Data

(60) Provisional application No. 61/258,944, filed on Nov. 6, 2009.

(51) Int. Cl.
*H04W 36/00* (2009.01)
*H04W 4/00* (2009.01)

(52) U.S. Cl.
USPC ........... 455/436; 455/437; 455/438; 455/439; 455/443; 455/444; 370/331

(58) Field of Classification Search
USPC ........... 455/436–439, 444, 448–449; 370/331
See application file for complete search history.

(56) References Cited

U.S. PATENT DOCUMENTS

| | | | |
|---|---|---|---|
| 5,987,332 A | 11/1999 | Gettleman et al. | |
| 7,184,789 B2 | 2/2007 | Leung et al. | |
| 7,330,727 B2 | 2/2008 | Korneluk et al. | |
| 2002/0168982 A1* | 11/2002 | Sorokine et al. | 455/442 |
| 2004/0176094 A1* | 9/2004 | Kim et al. | 455/438 |
| 2005/0111409 A1* | 5/2005 | Spear et al. | 370/331 |
| 2006/0293053 A1* | 12/2006 | Zanaty | 455/436 |
| 2008/0096581 A1 | 4/2008 | Do et al. | |
| 2008/0146232 A1* | 6/2008 | Knisely | 455/437 |
| 2008/0188215 A1 | 8/2008 | Bergstrom et al. | |
| 2010/0003986 A1 | 1/2010 | Chen | |
| 2010/0029277 A1* | 2/2010 | Ekstrom et al. | 455/436 |
| 2011/0032909 A1* | 2/2011 | Park et al. | 370/332 |

\* cited by examiner

*Primary Examiner* — Meless N Zewdu
*Assistant Examiner* — Dung Hong
(74) *Attorney, Agent, or Firm* — Jianq Chyun IP Office

(57) ABSTRACT

A wireless communication system delivering neighbor information (NBR-INF) and a base station and a wireless communication device thereof are proposed. The wireless communication system includes at least a mobile station and a base station. The base station decides delivering the NBR-INF triggered by events, determines type of the NBR-INF to be delivered and determines a delivery rule of the NBR-INF to be delivered. The mobile station, wirelessly connected to the at least a base station, receives the NBR-INF delivered from the at least a base station, and decides to completely renew or partially update its own neighbor information contents.

46 Claims, 7 Drawing Sheets

WIRELESS COMMUNICATION SYSTEM, COMMUNICATION DEVICE AND BASE STATION THEREOF

CROSS-REFERENCE TO RELATED APPLICATION

This application claims the priority benefit of U.S.A. provisional application Ser. No. 61/258,944, filed on Nov. 6, 2009, all disclosures are incorporated therewith.

TECHNICAL FIELD

The disclosure generally relates to a wireless communication system, and more particularly, to a wireless communication system delivering neighbor information triggered by events and a base station and a wireless communication device thereof.

BACKGROUND

Neighbor information (NBR-INF), which is usually transmitted through some control messages such as neighbor advertisement message in IEEE 802.16 standard, allows mobile stations in wireless communication system to know the information of neighboring cells or networks. Thereby, mobile stations can facilitate their neighbor cell scanning, neighbor cell monitoring, cell selection, network selection, handover and so forth according to the information of neighboring cells or networks.

NBR-INF provides details of neighbor cell information to facilitate handover, network selection and network reentry operations. For example, IEEE 802.16 system defines the neighbor advertisement management message, MOB_NBR-ADV, to describe characteristics of neighboring base stations to potential mobile station(s) seeking initial network entry or handover. The characteristics may contain physical layer (PHY) information, handover information, service-supporting information, downlink or uplink channel information of each of neighboring of base stations. NBR-INF is usually broadcasted periodically in a macro-cell deployment. The advantages of periodic broadcast are: the NBR-INF is delivered for possible large amount of mobile stations in a simple procedure on base stations; the NBR-INF is expectable for non-specific mobile stations. However, if there is only a small amount of mobile stations in the cell (e.g., in a femto cell environment or a Home eNodeB environment), and the neighbor topology or the neighbor configurations change seldom, the overhead of NBR-INF will be generated periodically. Moreover, the overhead would be considerable if the size of a NBR-INF is very large due to a lot of neighbor cells. Therefore, it is an important concern to reduce overhead of the NBR-INF and make delivery of the NBR-INF flexible.

SUMMARY

A wireless communication system adapted for delivering neighbor information (NBR-INF) is introduced herein. According to an exemplary embodiment, the wireless communication system includes at least a mobile station and at least a base station. The base station decides delivering NBR-INF triggered by an event comprising at least one of a system event, a command event or a request event, determines type of the NBR-INF to be delivered, determining a delivery type of the NBR-INF, and determines a delivery rule of the NBR-INF to be delivered. The mobile station, wirelessly connected to the base station, receives the NBR-INF delivered from the base station.

A base station adapted for delivering neighbor information is introduced herein. According to an exemplary embodiment, the base station decides to deliver the NBR-INF triggered by an event comprising at least one of a system event, a command event, or a request event, determines type of the NBR-INF to be delivered, determines a delivery type of the NBR-INF, determines a delivery rule of the NBR-INF to be delivered and transmits the NBR-INF according to the determined type and the determined delivered rule.

A wireless communication device adapted for receiving neighbor information is introduced herein. According to an exemplary embodiment, the delivery of the NBR-INF is triggered by an event comprising at least one of a system event, a command event, or a request event, the wireless communication device receives the NBR-INF, and requests to completely renew or partially update its own neighbor information contents, wherein the NBR-INF is delivered semi-periodic or non-periodic.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF THE EXEMPLARY EMBODIMENTS

Figure 1A:
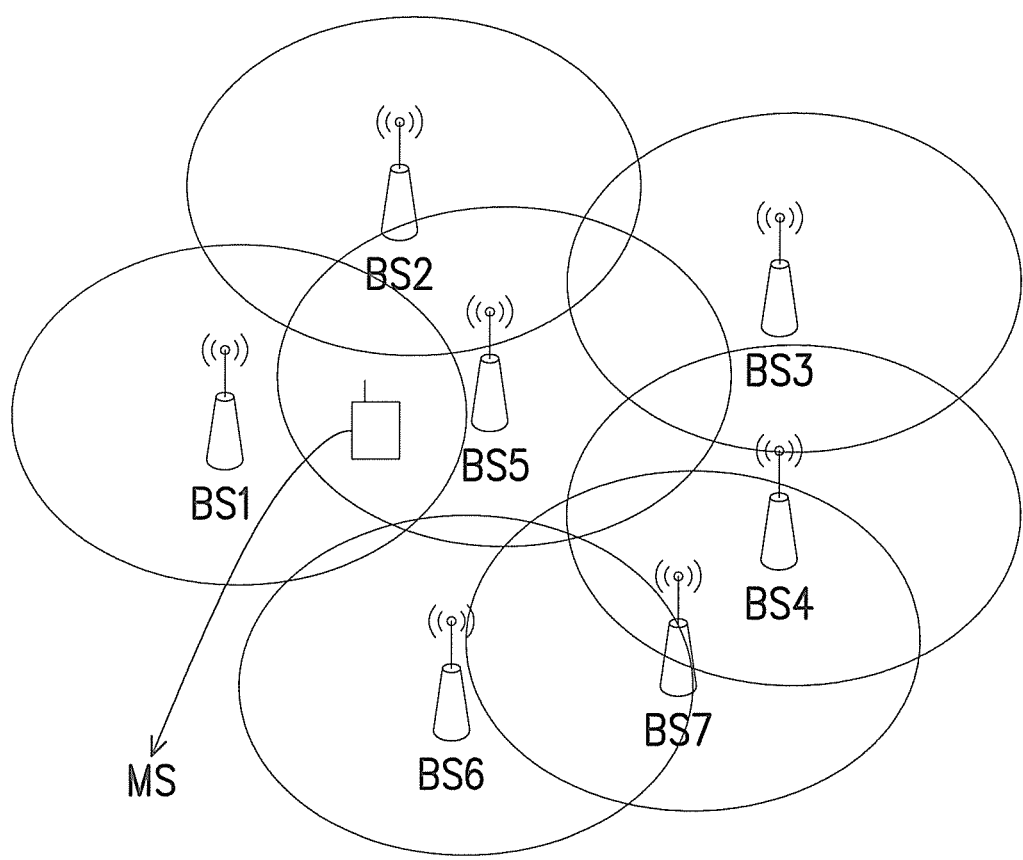
FIG. 1A is a schematic diagram illustrating a wireless cellular communication system.

Some embodiments of the present application will now be described more fully hereinafter with reference to the accompanying drawings, in which some, but not all embodiments of the application are shown. Indeed, various embodiments of the application may be embodied in many different forms and should not be construed as limited to the embodiments set forth herein; rather, these embodiments are provided so that this disclosure will satisfy applicable legal requirements. Like reference numerals refer to like elements throughout.

FIG. 1A is a schematic diagram illustrating a wireless cellular communication system 10. The wireless cellular communication system 10 includes a plurality of base stations (or wireless access point devices) such as base stations BS1, BS2, BS3, BS4, BS5, BS6 and BS7. For the simplicity of illustration, there is just a mobile station MS (or wireless communication terminal device) shown in FIG. 1A. The wireless cellular communication system 10 is just an exemplary example which can include more than just one mobile station in the system and the present disclosure is not limited thereto.

The conventional method for delivering neighbor information (abbreviated as "NBR-INF" thereinafter) from the base station BS5 to the mobile station MS in most current wireless cellular communication system generally follows a periodic broadcast fashion. The present disclosure provides several exemplary embodiments which propose a wireless communication system with more efficient and more effective neighbor information delivery processes. The exemplary embodiments also propose the communication devices (or wireless communication terminal device) and the base stations adapted for more efficiently and more effectively delivering neighbor information. The major goal of the exemplary embodiments proposed is to reduce overhead on the NBR-INF. Compared with the conventional delivery of the NBR-INF, overhead generated by periodic broadcasting the NBR-INF is reduced by event-triggered neighbor information delivery concept, and neighbor information overhead size is reduced by an update process or an update-check procedure.

Figure 1B:
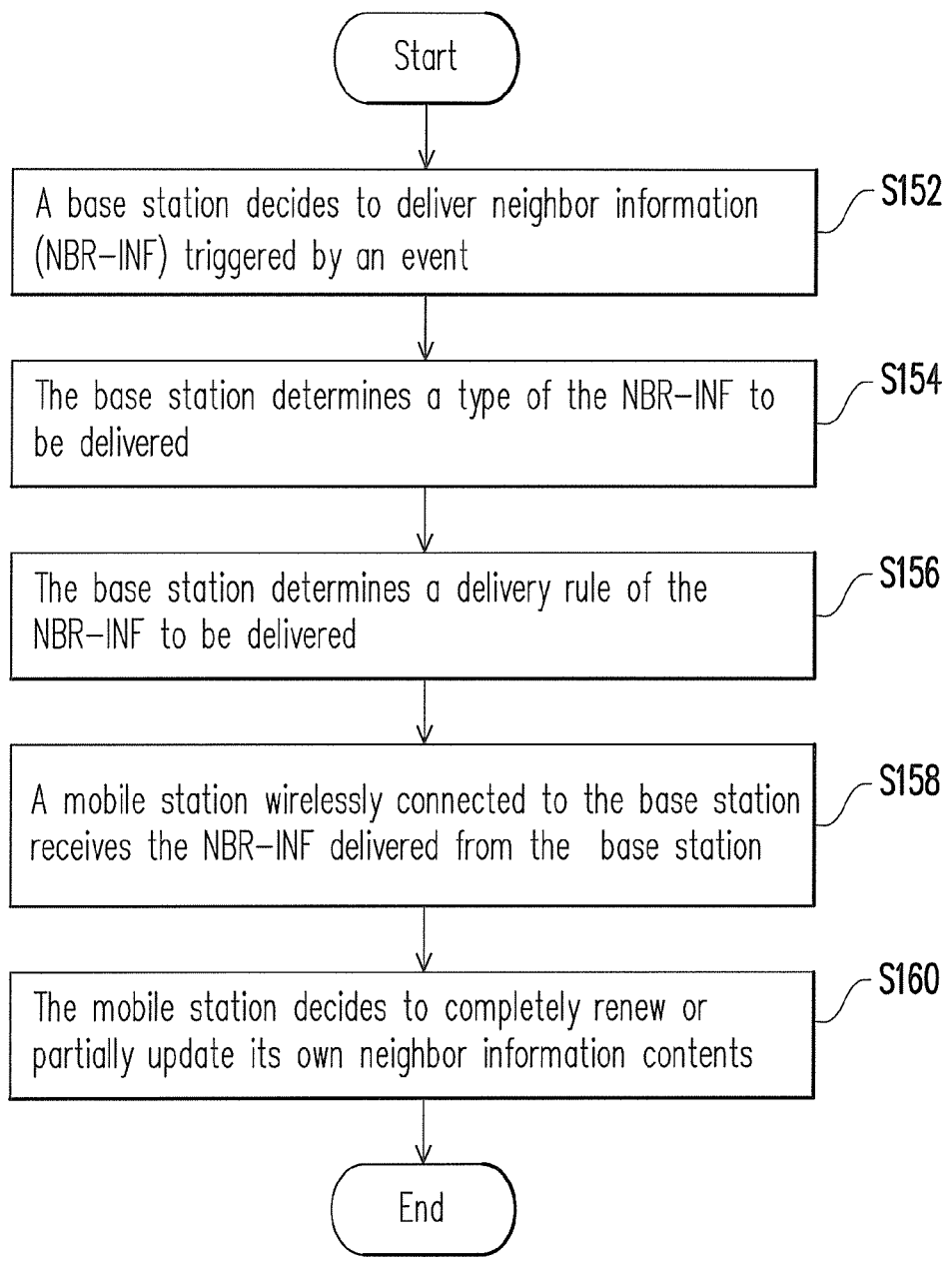
FIG. 1B is a flowchart illustrating a neighbor information delivery method triggered by an event according to a first exemplary embodiment.

In general, exemplary embodiments proposed by the disclosure can be briefly generalized as illustrated in FIG. 1B. FIG. 1B is a flowchart illustrating a neighbor information delivery method 15 triggered by an event according to a first exemplary embodiment. Referring to FIG. 1A, for example, the base station BS5 decides to deliver the NBR-INF triggered by an event or events including at least one of a system event, a command event or a request event (step S152). The base station BS5 determines a type of the NBR-INF to be delivered according to the event (step S154). Also, in the step S154, the base station BS5 may also determine a delivery type of the NBR-INF, where the delivery type of the NBR-INF can be, for example, broadcast, multicast, or unicast. The unicast of the NBR-INF is just to deliver the user-specific NBR-INF to a specific mobile station. The multicast of the NBR-INF includes broadcasting non-user-specific NBR-INF. For example, if the NBR-INF is requested by a mobile station but responded or delivered with broadcast connection identifier (CID) by the requested base station, then other mobile station may have an opportunity to receive the NBR-INF and further decides whether to update or renew their own NBR-INFs, or request to completely renew or partially update their own neighbor information contents.

The base station BS5 determines a delivery rule of the NBR-INF to be delivered according to the event (step S156). The mobile station MS which is wirelessly connected to the base station BS5 receives the NBR-INF delivered from the base station BS5 (step S158). The mobile station MS decides or requests to completely renew or partially update its own neighbor information contents (step S160). The neighbor information delivery method 15 is terminated at the step S160.

The exemplary embodiments shown below generally delivers neighbor information triggered by a specific event including at least one of a system event or a request event. The system event include at least one of a network entry event, a network reentry event, a neighbor scanning request event, a neighbor scanning command event, a handover request event, a handover command event, a location update request event, or a location update command event. The request event includes at least one of a mobile station's request for NBR-INF with a valid identification (ID), a mobile station's request for NBR-INF anonymously or a base station's request for updating the NBR-INF event. For example in IEEE 802.16 systems, a mobile station may send an "advanced air interface neighbor request (AAI-NBR-REQ)" message or a neighbor request indication to request for neighbor information. The command event includes at least one of the instruction to execute, response, reply, report, associated signalling or configuration, and etc. It is to be noted that the network entry event and the network reentry event refer to the situation where a new corner (i.e., a mobile station or user equipment) wants to know the NBR-INF of the current base station. Moreover, the corresponding action of NBR-INF delivery can be varied depending upon other two factors such as the types of the NBR-INF and the delivering rule of the NBR-INF.

To be more specific, the types of the NBR-INF can be, for example, a normal NBR-INF, a reduced NBR-INF and an updated NBR-INF. These three types of the NBR-INF can be applied by a base station to the exemplary embodiments described below with appropriate adjustments. The normal NBR-INF has a NBR-INF format similar to the conventional NBR-INF format, and the normal NBR-INF can contain complete candidate cell information such as physical cell identification (cell ID), medium access control (MAC) ID, operation frequency or operation frequencies of neighbor cells, cell type and so fourth. It is to be noted that the term "complete" merely refers to the possible neighboring cell information which can be obtained by a current serving cell base station. The NBR-INF can be used to assist a mobile station to search for neighbor cell base station or scan neighboring cell base stations.

The reduced NBR-INF can be classified as the following two categories such as a first category and a second category. The first category of reduced NBR-INF can merely contain a version number or a version number of named change count. By doing so, the amount of NBR-INF can be reduced dramatically when there is little or none change in neighboring cell information. The mobile station can use the version number in the first category of reduced NBR-INF to determine if the current NBR-INF stored locally is out-of-date. The mobile station can then further take action to have its own NBR-INF updated by the current serving cell base station. The update process will be provided in the exemplary embodiments illustrated below. In addition to the version number, the second category of reduced NBR-INF can contain a limited number of candidates of neighboring cell information. For example, the second category of reduced NBR-INF can have a default set of candidate neighboring cell, or certain types of cells such as macro cells, micro cells, pico cells, femto cells, relay cell and so forth.

Also, the base station can apply the second category of reduced NBR-INF depending upon the type of the mobile stations. For example, if the mobile station requesting for update of NBR-INF is a high-speed mobile station, then the second category of reduced NBR-INF delivered to the high-speed mobile station from the base station can just contain NBR-INF of macro cells instead of delivering NBR-INF of pico cells and femto cells. The disclosure is not limited thereto and the base station can also apply the second, category of reduced NBR-INF depending upon moving direction, preference and velocity of the mobile station. For example, referring to FIG. 1, if the mobile station MS has previously send a request for NBR-INF with a preference on femto cells to the base station BS5, then the second category of reduced NBR-INF delivered to the mobile station can just contain the NBR-INF of femto cells. For another example, if the mobile station MS is moving in a direction from the base station BS5 to the base station BS3, then the current serving cell base station BS5 can decide to send the second category of reduced NBR-INF with just base station BS2, BS3 and BS4 but without the base stations BS1, BS6 and BS7. Therefore, the amount of the NBR-INF delivered to the mobile station can be reduced dramatically, and the delivery process of NBR-INF can be more efficient and more effective.

Moreover, the updated NBR-INF can contain partial NBR-INF information that requires to be updated for the mobile station. The base station can determine the partial content to be updated for mobile station according to the version number of the NBR-INF stored locally in the mobile station fed back from the mobile station. Thus, the amount of the NBR-INF delivered to the mobile station can be reduced dramatically, and the delivery process of NBR-INF can be more efficient and more effective.

Furthermore, the delivering rule of the NBR-INF can be, for example, semi-periodic and non-periodic. It is a drastic change compared to the conventional delivering rule of the NBR-INF, which is normally delivered or broadcast periodically. Also, the non-periodic example also can be applied to unicast delivering of the NBR-INF triggered by at least one of a request event or a command event. The conventional unicast delivering of the NBR-INF can merely reply the complete NBR-INF of specific base station or specific base stations whose NBR-INF are previously requested by the mobile station with the cell ID provided in the request message or command message. In contrast, the exemplary embodiments provide unicast delivering of the NBR-INF in which the NBR-INF can include at least one of the normal NBR-INF, the reduced NBR-INF or the updated NBR-INF.

The semi-periodic delivery of the NBR-INF is normally periodic but can have the contents of the NBR-INF reduced or the transmission of the NBR-INF omitted if there is no request or command provided by the mobile stations within a limited period. On the other hand, in the semi-periodic delivery of the NBR-INF, the mobile station can make a request or command for the NBR-INF with an valid ID or make a request or command for the NBR-INF anonymously, and the base station can then transmit the NBR-INF at the expected time instant or in the expected time period to the mobile station which made the request or command for the NBR-INF. In the semi-periodic NBR-INF delivery, the base station omits delivering of the NBR-INF when there is no request or command for the NBR-INF received in a period between a current time instant and a contiguously previous time instant The non-periodic delivery of the NBR-INF is generally in response to event or events which are not directly related to the request or command for the NBR-INF. This is, the mobile station does not actively and directly request for the NBR-INF but the latest NBR-INF is required for the purpose of the subsequent action of the mobile station. In other words, in the non-periodic NBR-INF delivery, the base station delivers the NBR-INF in response to events not directly related to the request or command of the NBR-INF. To be more specific, the non-periodic delivery of the NBR-INF is still triggered by an event including at least one of the network entry event, the network reentry event, the neighbor scanning request event, the neighbor scanning command event, the handover request event, the handover command event, the location update request event, or the location update command event.

The above-described technical features associated with the neighbor information delivery can be easily applied in wireless communication systems such as IEEE 802.16 m, where the NBR-INF is delivered in neighbor advertisement (NBR-ADV) message from the base station to the mobile station(s). Table I is just an exemplary example illustrating standard parameters (from a Table 692 of the IEEE 802.16 m standard) which can be used along with the neighbor information delivery of the exemplary embodiments below. The neighbor information delivery method proposed by exemplary embodiments below can also be applied in other wireless communication system.

TABLE I

NBR-ADV parameters

| Mandatory Requirement | Attributes/ Array of attributes | Size (bits) | Value/Note | Conditions |
| --- | --- | --- | --- | --- |
| Mandatory | Change Count | 3 | NBR-ADV Change Count | N/A |
| Mandatory | Cell type | 3 | Cell type in this message<br>0b000: macro cell<br>0b001: micro cell<br>0b010: macro hotzone<br>0b011: femto cell<br>0b100: relay cell<br>0b101-0b111: reserved<br>... | N/A |
| Mandatory | BSID | 48 | N/A | Shall be included for each neighbor base station |

Figure 2:
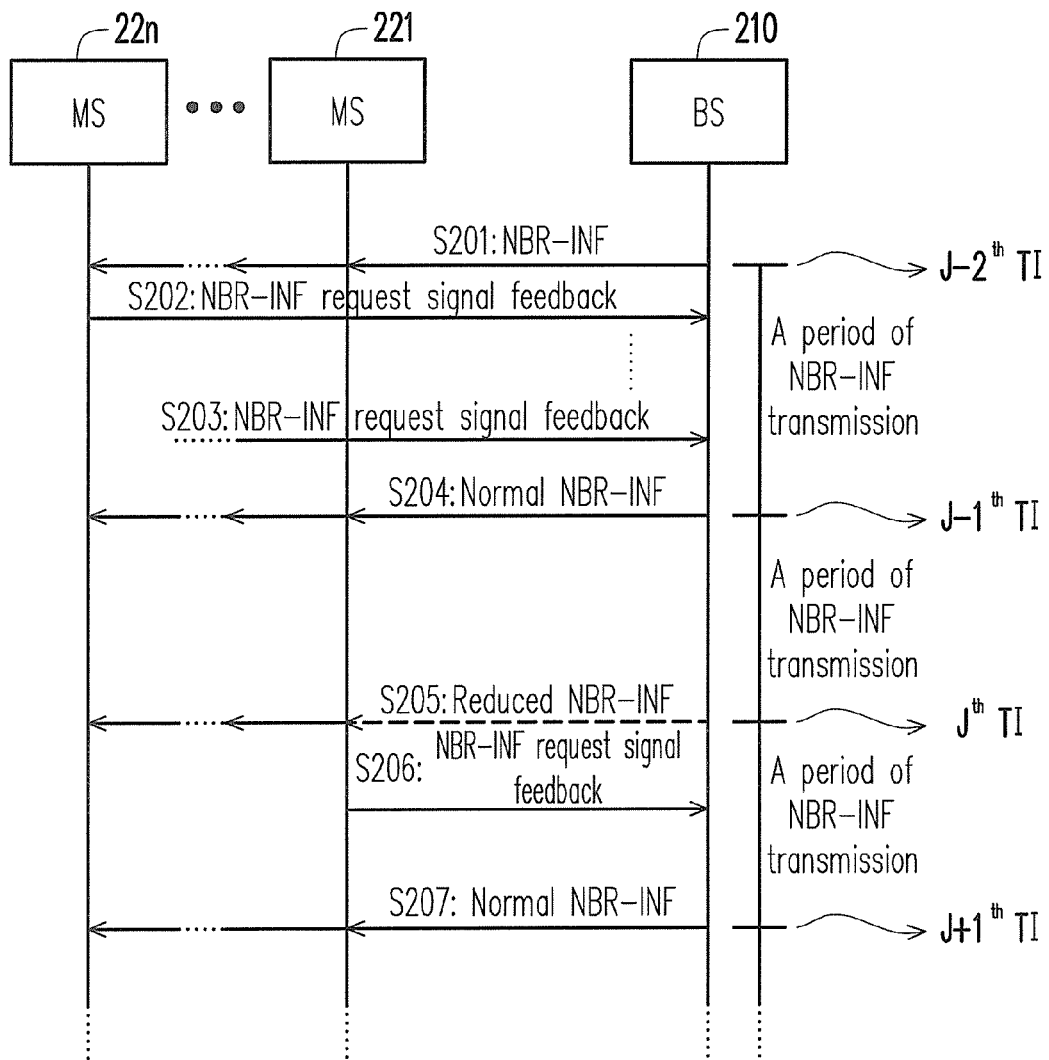
FIG. 2 is a schematic flowchart illustrating a neighbor information delivery method triggered by a request event according to a second exemplary embodiment.

FIG. 2 is a schematic flowchart illustrating a neighbor information delivery method 20 triggered by a request event according to a second exemplary embodiment. The neighbor information delivery method 20 has a periodic transmission schedule of the NBR-INF but the contents can be reduced or omitted in some transmission instants (TI). Therefore, the neighbor information delivery method 20 can be broadcasting the NBR-INF in a semi-periodic manner. Referring to FIG. 2, the wireless cellular communication system can include more than one base station but in order to illustrate the request event and the corresponding action of delivering the NBR-INF, there is just one base station 210 shown in FIG. 2 along with mobile stations 221 and 22n. The vertical axe of FIG. 2 is a time domain illustration which exemplarily shows four time instants (TI) such as J−2th TI, J−1th TI, Jth TI and J+1th TI. The disclosure is not limited thereto, and the neighbor information delivery method 20 can be applied to more than two mobile stations.

Referring to FIG. 2, the neighbor information delivery method 20 can include at least two exemplary situations. The first exemplary situation has the corresponding action of the reduced NBR-INF; the second exemplary situation has the corresponding action of the omitted NBR-INF. Normally, the base station 210 broadcasts the normal NBR-INF to all of the mobile stations 221 and 22n at each one of time instants, as illustrated in step S201 During the period of the NBR-INF transmission between the J−2th TI and the J−1th TI, the base station 210 receives a request message for the NBR-INF feedback from the mobile station 22n (step S202), and also receives a request message for the NBR-INF feedback from another mobile station not shown in FIG. 2 (step S203). Therefore, the base station 210 periodically broadcast the normal NBR-INF at the J−1th TI since there is at least a request event occurred during the period between the J−2th TI and the J−1th TI. However, during the period between the J−1th TI and the Jth TI, there is no request event occurred (no request message feedback from any mobile station to the base station 210), so the base station 210 transmits the reduced NBR-INF (step S205), and the reduced NBR-INF, for example, contains just the version number in order to reduce the amount of the NBR-INF. The above-described situation is the first exemplary situation.

However, the disclosure is not limited thereto, and in the second exemplary situation, the base station 210 can decide not to transmit the NBR-INF at the Jth TI, and this is corresponding action of the omitted NBR-INF since there is no request event occurred during the period between the J−1th TI and the Jth TI. During the period between the Jth TI and the J+1th TI, the base station 210 receives the a request message for the NBR-INF feedback from the mobile station 221 (Step 206), so the base station 210 resumes to periodically broadcast the normal NBR-INF at the J+1th TI (step 207. The possible combinations of the step 201 to the step 207 can be deduced from the neighbor information delivery method 20 for achieving efficient delivery of the NBR-INF.

In the first exemplary embodiment, during any two contiguous TIs, the base station 210 can allocate at least an uplink feedback channel or a random access channel for any one of mobile stations within the coverage of the base station 210 to make a request for the normal NBR-INF (by a request message). For example, in the IEEE 802.16 m standard, a possible uplink feedback channel can be an initial ranging slot associated with a specified ranging code, where the specified ranging code is provided to the base station in the request message for the normal NBR-INF. Also, during any two contiguous TIs (or a ranging slot in the IEEE 802.16 m standard), there can be more than one ranging codes to be transmitted. Moreover, the uplink feedback channel or a random access channel is particularly useful and beneficially for the mobile station in an idle mode (or an idle state) in which the mobile station is not always connected with the base station to make a request for the NBR-INF in, for example, a location update event. However, the uplink feedback channel or a random access channel can also be applied to the connected mode (connected state) event including at least one of a handover event, a neighbor scan event, a network entry event or a network reentry event. It is to be noted that the request for the NBR-INF made by any one of mobile stations within the coverage of the base station can be anonymous or with the specified ID.

Figure 3:
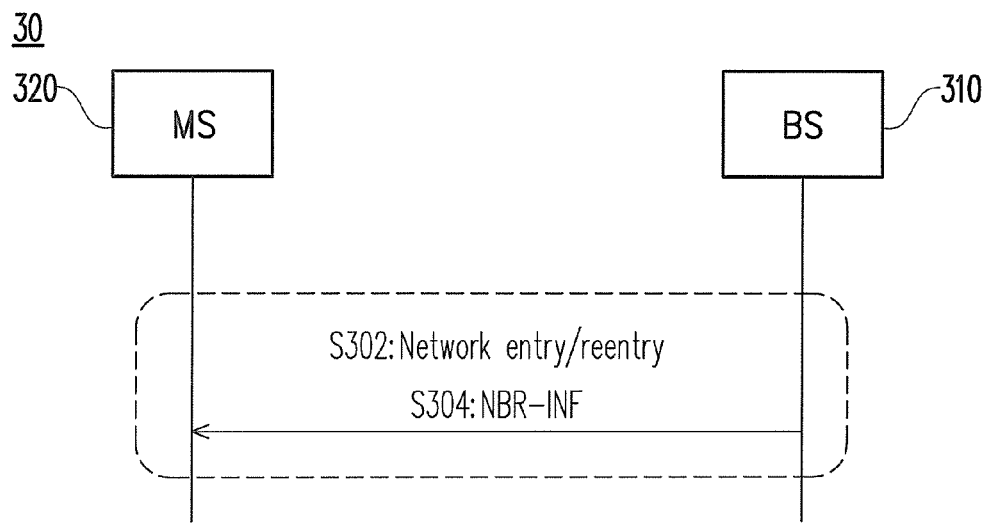
FIG. 3 is a schematic flowchart illustrating a neighbor information delivery method triggered by a system event according to a third exemplary embodiment.

FIG. 3 is a schematic flowchart illustrating a neighbor information delivery method 30 triggered by a system event according to a third exemplary embodiment. The neighbor information delivery method 30 starts at step S302, where the base station 310 detects a network entry event or a network reentry event of a mobile station 320. It is to be noted that, in the present embodiment, the base station 310 unicasts the NBR-INF to the mobile station 320 during a network entry procedure or a network reentry procedure performed between the mobile station 320 and the base station 310 (step S304). The NBR-INF can be normal NBR-INF, reduced NBR-INF or the updated NBR-INF herein. In addition, in the present embodiment, the NBR-INF is one of the system information provided by the base station 310 to the mobile station 320 during the network entry procedure or the network reentry procedure. The neighbor information delivery method 30 is terminated after the step S304.

Figure 4:
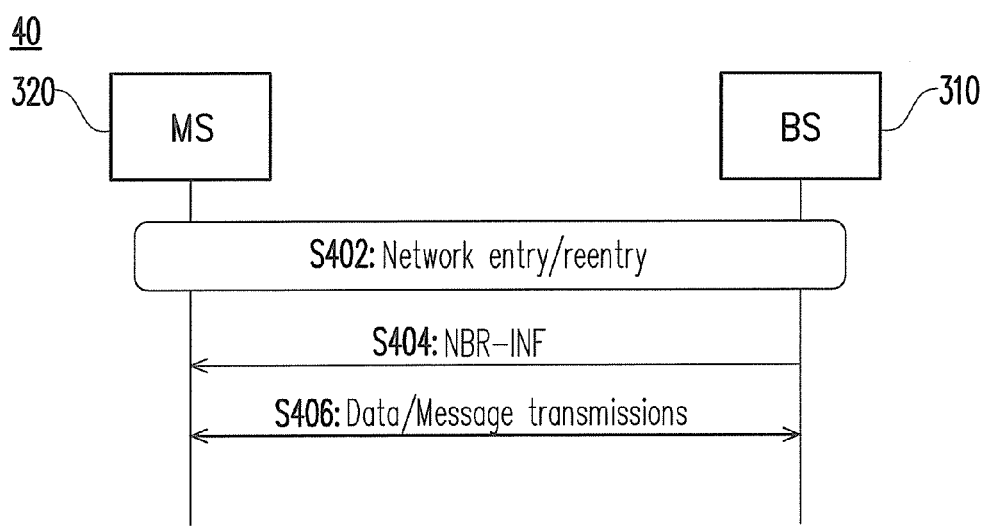
FIG. 4 is a schematic flowchart illustrating a neighbor information delivery method triggered by a system event according to a fourth exemplary embodiment.

FIG. 4 is a schematic flowchart illustrating a neighbor information delivery method 40 triggered by a system event according to a fourth exemplary embodiment. The neighbor information delivery method 40 starts at step S402, where the base station 310 detects a network entry event or a network reentry event of the mobile station 320. It is to be noted that, in the present embodiment, the base station 310 unicasts the NBR-INF to the mobile station 320 immediately after the mobile station 320 completes a network entry procedure or a network reentry procedure (step S404). The NBR-INF can be normal NBR-INF, reduced NBR-INF or the updated NBR-INF herein. Then, other data exchange or message exchange can be performed between the mobile station 320 and the base station 310 (step S406). Moreover, in the present embodiment, the NBR-INF is delivered by the base station 310 to the mobile station 320 immediately after the mobile station 320 completes a network entry procedure or a network reentry procedure and before any other data exchange or message exchange. The neighbor information delivery method 40 is terminated after the step S406.

Figure 5:
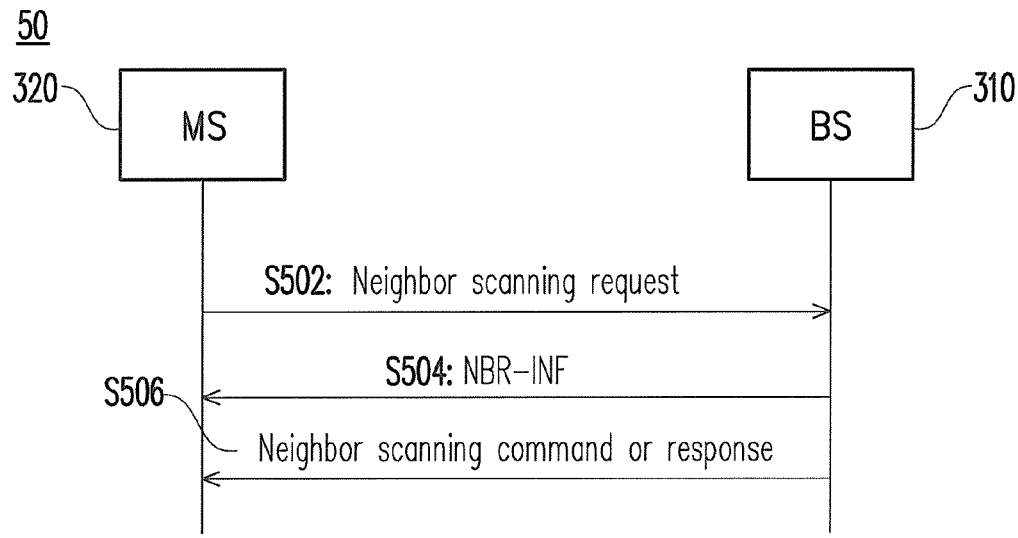
FIG. 5 is a schematic flowchart illustrating a neighbor information delivery method triggered by a system event according to a fifth exemplary embodiment.

FIG. 5 is a schematic flowchart illustrating a neighbor information delivery method 50 triggered by a system event according to a fifth exemplary embodiment. The neighbor information delivery method 50 starts at step S502, where the base station 310 receives a neighbor scanning request message transmitted from the mobile station 320. It is to be noted that, in the present embodiment, the base station 310 unicasts the NBR-INF to the mobile station 320 upon receiving the neighbor scanning request message of the mobile station 320 (step S504). The NBR-INF includes at least one of a normal NBR-INF, a reduced NBR-INF, or an updated NBR-INF herein. Then, other messages such as a neighbor scanning command or a neighbor scanning response can be transmitted from the base station 310 to the mobile station 320 (step S506). Moreover, in the present embodiment, the base station 310 no longer requires to periodically broadcast the NBR-INF in comparison of the conventional NBR-INF delivery approach, thereby saving substantial amount of resources for broadcasting a complete NBR-INF. The neighbor information delivery method 50 is terminated after the step S506.

Figure 6:
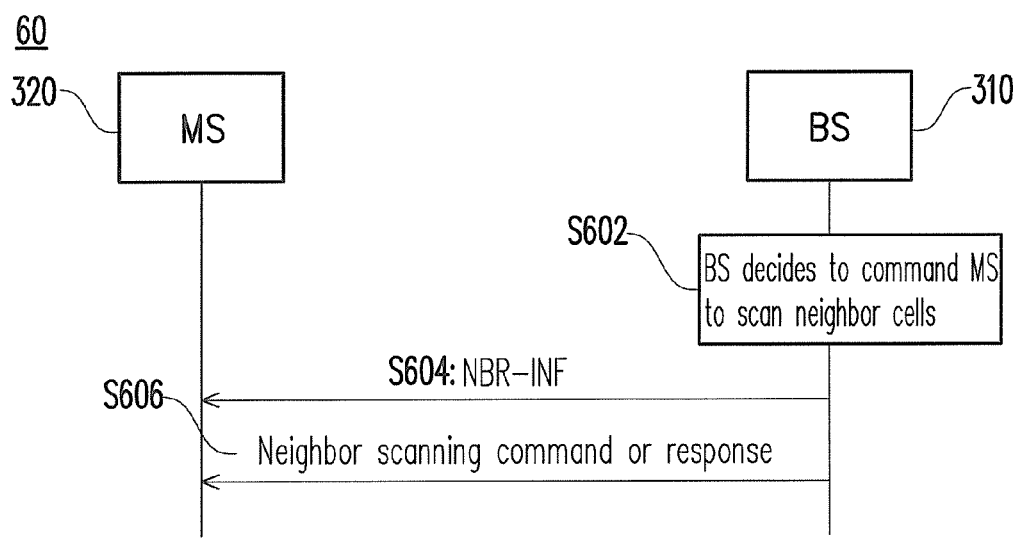
FIG. 6 is a schematic flowchart illustrating a neighbor information delivery method triggered by a system event according to a sixth exemplary embodiment.

FIG. 6 is a schematic flowchart illustrating a neighbor information delivery method 60 triggered by a system event according to a sixth exemplary, embodiment. The neighbor information delivery method 60 starts at step S602, where the base station 310 decides to command the mobile station 320 to scan neighboring cells. It is to be noted that, in the present embodiment, the base station 310 unicasts the NBR-INF to the mobile station 320 after the decision of commanding the mobile station 320 to scan the neighboring cells (step S604) but before actually unicasting a neighbor scanning command or a neighbor scan response to the mobile station 320. The NBR-INF includes at least one of the normal NBR-INF, the reduced NBR-INF, or the updated NBR-INF herein. Then, the neighbor scanning command or the neighbor scanning response can be transmitted from the base station 310 to the mobile station 320 (step S606). The neighbor information delivery method 60 is terminated after the step S606. Though the neighbor scanning command illustrated in FIG. 6 is issued by the base station, the present disclosure is not limited thereto. In other exemplary embodiments of the disclosure, the neighbor scanning command can also be initiated and issued by the mobile station.

Figure 7:
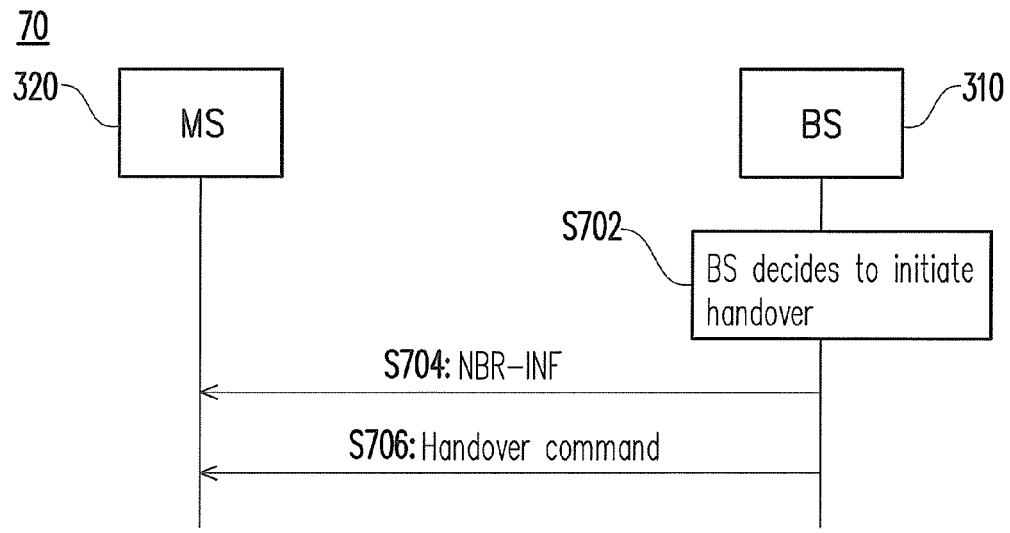
FIG. 7 is a schematic flowchart illustrating a neighbor information delivery method triggered by a system event according to a seventh exemplary embodiment.

FIG. 7 is a schematic flowchart illustrating a neighbor information delivery method 70 triggered by a system event according to a seventh exemplary embodiment. The neighbor information delivery method 70 starts at step S702, where the base station 310 decides to initiate handover of the mobile station 320. For example, the base station 310 decides to initiate the handover of the mobile station 320 due to poor signal quality of the received signal at the mobile station 320. It is to be noted that, in the present embodiment, the base station 310 unicasts the NBR-INF to the mobile station 320 after the decision of commanding the mobile station 320 to scan the neighboring cells (step S704) but before actually unicasting a handover command to the mobile station 320. The NBR-INF includes at least one of the normal NBR-INF, the reduced NBR-INF, or the updated NBR-INF herein. Then, the handover command can be transmitted from the base station 310 to the mobile station 320 (step S706). The neighbor information delivery method 70 is terminated after the step S706. Though the handover command illustrated in FIG. 7 is issued by the base station, the present disclosure is not limited thereto. In other exemplary embodiments of the disclosure, the handover command can also be initiated and issued by the mobile station.

Figure 8:
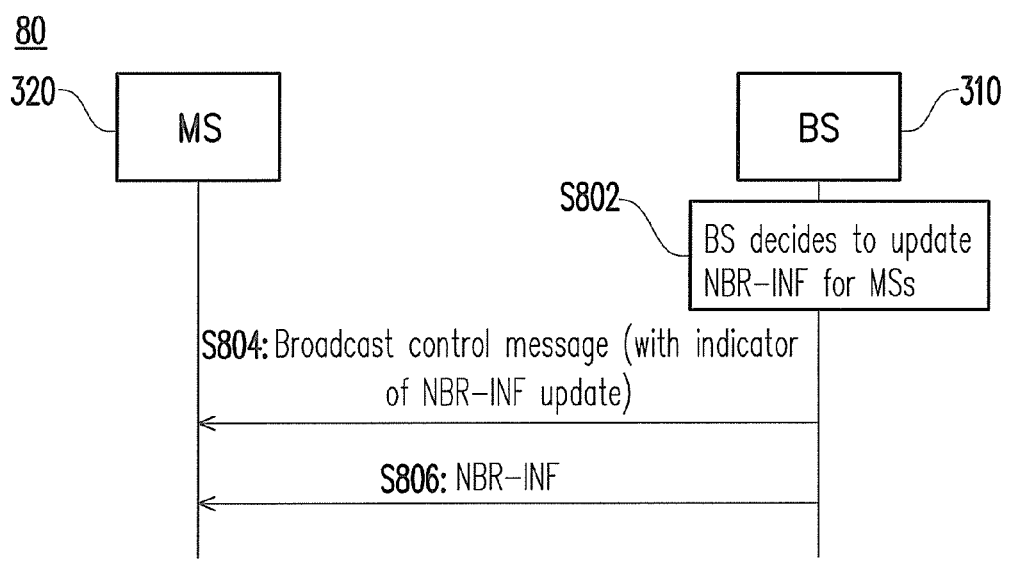
FIG. 8 is a schematic flowchart illustrating a neighbor information delivery method triggered by a system event according to an eighth exemplary embodiment.

FIG. 8 is a schematic flowchart illustrating a neighbor information delivery method 80 triggered by a system event according to an eighth exemplary embodiment. The neighbor information delivery method 80 starts at step S802, where the base station 310 decides to update the NBR-INF for all of mobile stations within the coverage of the base station 310, including the mobile station 320. It is to be noted that, in the present embodiment, the mobile station 320 in FIG. 8 is merely for an illustration example. For example, the base station 310 decides to update the NBR-INF due to the NBR-INF has been changed, or the base station 310 attempts to make the NBR-INF of the mobile station 310 up-to-date and/or any other reasons.

In step S804, the base station 310 uses an indicator of the NBR-INF update in a broadcast control message to announce an update of the NBR-INF to all of the mobile stations within the coverage of the base station 310, including the mobile station 320. Then, the NBR-INF can be delivered from the base station 310 to the mobile station 320 (step S806). The NBR-INF can be normal NBR-INF, reduced NBR-INF or the updated NBR-INF herein. For example, the base station 310 can broadcast the NBR-INF in one of pre-defined transmission resource or in a plurality of pre-defined transmission resources. For another example, the base station 310 can merely broadcast a version number of the NBR-INF. Then, any of the mobile stations within the coverage of the base station 310 finds the version number of its own NBR-INF is out-of-date or different can request for the NBR-INF delivery from the base station 310. The neighbor information delivery method 80 is terminated after the step S806.

Figure 9:
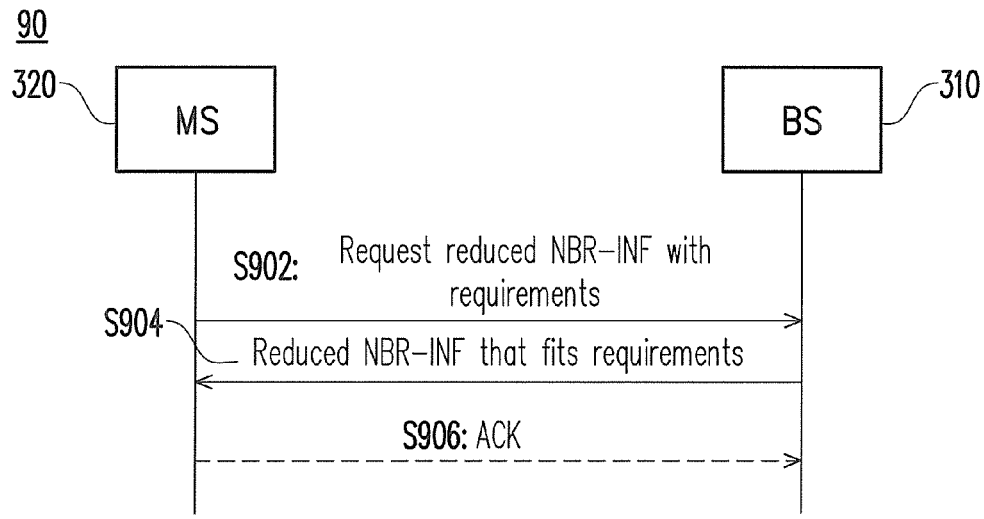
FIG. 9 is a schematic flowchart illustrating a customized neighbor information delivery method triggered by a request event according to a ninth exemplary embodiment.

FIG. 9 is a schematic flowchart illustrating a customized neighbor information delivery method 90 triggered by a request event according to a ninth exemplary embodiment. In the present embodiment, the customized neighbor information delivery method 90 delivers customized NBR-INF such as the reduced NBR-INF. The customized neighbor information delivery method 90 starts at step S902, where the mobile station 320 requests for the reduced NBR-INF in a request message transmitted to the base station 310. The request message contains specific requirements including at least one of the following: a version number of the NBR-INF at the base station 310, a default candidate of neighboring cells base stations, a limited number of neighboring cells base station with prioritization, a limited number of neighboring cells base station without prioritization, a certain cell type(s), a required form of the NBR-INF or a required format of the NBR-INF. It is to be noted that, in the present embodiment, the mobile station 320 in FIG. 8 is merely for an illustration example.

In the present embodiment, the limited number of neighboring cells base station without prioritization refers to the exemplary example that the base station 310 prioritizes the neighboring cells base stations, and the mobile station 320 can follow the prioritized order to perform, for example, a handover or a neighboring scan. The certain cell types include at least one of a femto call, a pico cell, a micro cell, or macro cell. For example, the base station 310 may request just the NBR-INF of the femto cells to be delivered. The required format of the NBR-INF refers to a content arrangement form a or a specified compressed format in order to further save the amount of information for delivering the reduced NBR-INF. For example, the mobile station 320 can request for the NBR-INF containing the specified operational frequencies of the base stations, so the required format of the NBR-INF delivered by the base station 310 can have just the specified operational frequencies and the corresponding base stations identification (BSID).

In step S904, the base station 310 transmits the reduced NBR-INF that satisfies the specified requirements of the mobile station 320. In step S906, an acknowledgement message is fed back from the mobile station 320 to the base station 310. The customized neighbor information delivery method 100 is terminated after the step S906.

Figure 10:
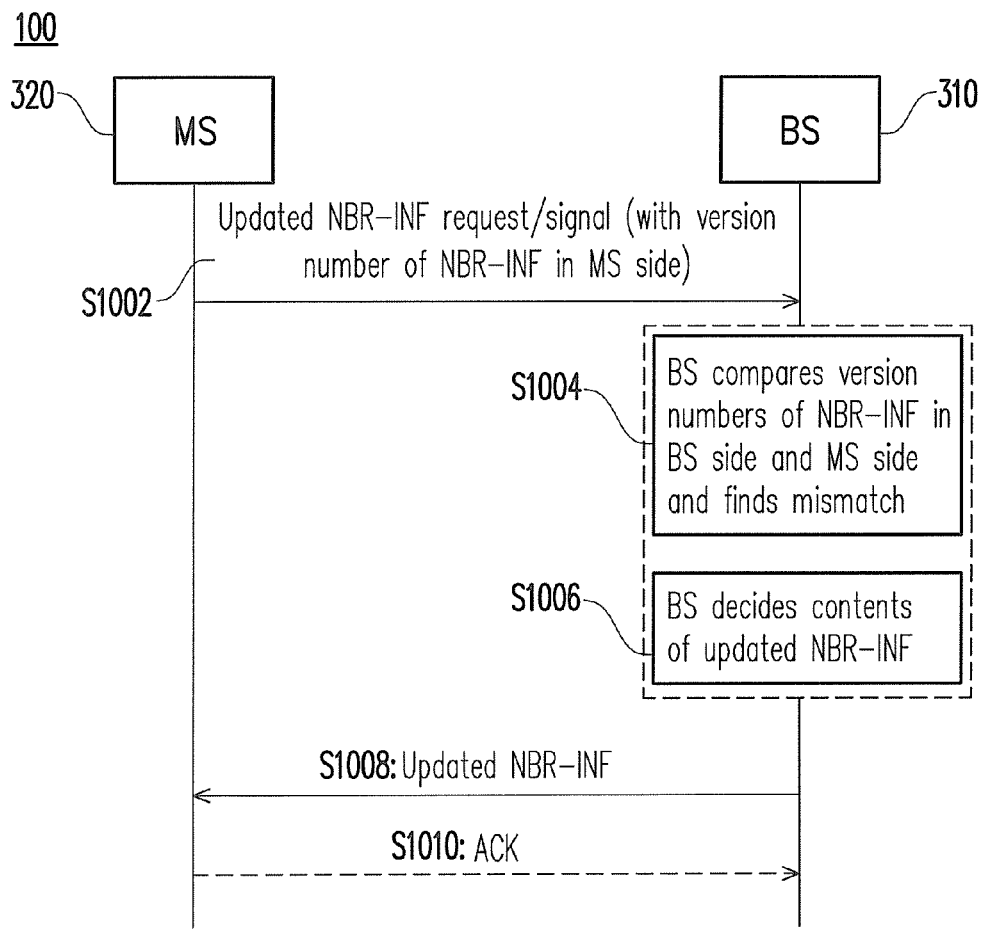
FIG. 10 is a schematic flowchart illustrating a customized neighbor information delivery method triggered by a request event according to a tenth exemplary embodiment.

FIG. 10 is a schematic flowchart illustrating a customized neighbor information delivery method 100 triggered by a request event according to a tenth exemplary embodiment. In the present embodiment, the customized neighbor information delivery method 100 delivers customized NBR-INF such as the updated NBR-INF. The customized neighbor information delivery method 100 starts at step S1002, where the mobile station 320 transmits to the base station 310 an update NBR-INF request message or transmits an update NBR-INF signal with a version number of the NBR-INF locally stored at the mobile station 320. In step S1004, the base station 310 obtains the first version number of the NBR-INF locally stored at the mobile station 320 and compares the first version number with a second version number of the current NBR-INF at the base station 310. If the base station 310 finds a mismatch between the first version number of the NBR-INF locally stored at the mobile station 320 and the second version number of the current NBR-INF at the base station 310, then in step S1006, the base station 310 decides the content of the updated NBR-INF.

In step S1008, the base station 310 transmits the updated NBR-INF to the mobile station 320. In step S1010, an acknowledgement message is feedback from the mobile station 320 to the base station 310. The customized neighbor information delivery method 100 is terminated after the step S1010.

In summary, according to the exemplary embodiments of the disclosure, a wireless communication system delivering neighbor information triggered by events and a base station and a wireless communication device thereof are proposed. The neighbor information is delivered based on trigger of one of at least a system event, a command event, or a request event. The base station and the communication device (e.g., the mobile station) can also perform update-check procedure to decide if the neighbor information update is required or not. The base station can further decide the contents of neighbor information for delivery, such as complete set of contents or differential set of contents, and decide to use unicast or multicast delivery manner. According to the contents of received neighbor information, the wireless communication device may decide or request to completely renew or partially update its own neighbor information contents.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A wireless communication system, adapted for delivering neighbor information (NBR-INF), comprising:
at least one base station, configured for deciding to deliver the NBR-INF triggered by an event comprising at least one of a system event, a command event or a request event, determining type of the NBR-INF to be delivered, determining a delivery type of the NBR-INF, and determining a delivery rule of the NBR-INF to be delivered; and
at least one mobile station, wirelessly connected to the at least one base station, configured for receiving the NBR-INF delivered from the at least one base station,
wherein the delivery rule of the NBR-INF to be delivered comprises at least one of a semi-periodic NBR-INF delivery or a non-periodic NBR-INF delivery,
wherein in the semi-periodic NBR-INF delivery, the at least one base station decides to deliver a reduced NBR-INF at a current time instant when there is no request for the NBR-INF received in a period between the current time instant and a contiguously previous time instant.

2. The wireless communication system according to claim 1, wherein the request event is a neighbor information request.

3. The wireless communication system according to claim 2, wherein the neighbor information request comprises at least one of a mobile station's request for NBR-INF with a valid identification, or a mobile station's request for NBR-INF anonymously.

4. The wireless communication system according to claim 1, wherein the system event comprises at least one of a network entry event, a network reentry event, a location update request event, or a location update command event.

5. The wireless communication system according to claim 1, wherein the type of the NBR-INF comprises a normal NBR-INF.

6. The wireless communication system according to claim 1, wherein in the non-periodic NBR-INF delivery, the at least one base station delivers the NBR-INF in response to events not directly related to the request of the NBR-INF.

7. The wireless communication system according to claim 6, wherein in the non-periodic NBR-INF delivery, the at least one base station delivers the NBR-INF triggered by at least one of a network entry event, a network reentry event, a location update request event, or a location update command event.

8. The wireless communication system according to claim 1, in the semi-periodic NBR-INF delivery, the at least one base station allocates at least an uplink feedback channel for the at least one mobile station to make a request for the normal NBR-INF.

9. The wireless communication system according to claim 8, wherein the request for the normal NBR-INF made by the at least one mobile station is anonymous.

10. The wireless communication system according to claim 1, wherein the delivery type of the NBR-INF comprises unicast.

11. The wireless communication system according to claim 1, wherein the at least one base station decides whether to deliver the NBR-INF and the type of the NBR-INF at the current time instant according to whether any event occurs in the period between the current time instant and the contiguously previous time instant.

12. The wireless communication system according to claim 1, wherein the at least one mobile station further requests to completely renew or partially update its own neighbor information contents.

13. The wireless communication system according to claim 1, wherein the command event comprises at least one of the instruction to execute, response, reply, report, associated signalling or configuration.

14. A base station, adapted for delivering neighbor information (NBR-INF), wherein the base station is configured for deciding to deliver the NBR-INF triggered by an event comprising at least one of a system event, a command event or a request event, determining type of the NBR-INF to be delivered, determining a delivery type of the NBR-INF, determining a delivery rule of the NBR-INF to be delivered, and transmits the NBR-INF according to the determined type and the determined delivered rule,
wherein the delivery rule of the NBR-INF to be delivered is a semi-periodic NBR-INF delivery and a non-periodic NBR-INF delivery,
wherein in the semi-periodic NBR-INF delivery, the base station decides to deliver a reduced NBR-INF at a current time instant when there is no request for the NBR-INF received in a period between the current time instant and a contiguously previous time instant.

15. The base station according to claim 14, wherein the request event is a neighbor information request.

16. The base station according to claim 15, wherein the request event comprises one of a request for NBR-INF with a valid identification, or a request for NBR-INF anonymously.

17. The base station according to claim 14, wherein the system event comprises at least one of a network entry event, a network reentry event, a location update request event, or a location update command event.

18. The base station according to claim 14, wherein the delivery type of the NBR-INF comprises unicast.

19. The base station according to claim 14, wherein the base station decides whether to deliver the NBR-INF and the type of the NBR-INF at the current time instant according to whether any event occurs in the period between the current time instant and the contiguously previous time instant.

20. The base station according to claim 14, wherein the type of the NBR-INF is a normal NBR-INF.

21. The base station according to claim 14, wherein in the semi-periodic NBR-INF delivery, the base station allocates at least an uplink feedback channel for receiving a request for a normal NBR-INF.

22. The base station according to claim 14, wherein in the non-periodic NBR-INF delivery, the base station delivers the NBR-INF in response to events not directly related to the request of the NBR-INF.

23. The base station according to claim 14 wherein in the non-periodic NBR-INF delivery, the base station delivers the NBR-INF triggered by at least one of a network entry event, a network reentry event, a location update request event, or a location update command event.

24. The base station according to claim 14, wherein the base station unicasts the NBR-INF during a network entry procedure or a network reentry procedure.

25. The base station according to claim 14, wherein the base station unicasts the NBR-INF immediately after a network entry procedure or a network reentry procedure is completed and before any other message exchange or any other data exchange.

26. The base station according to claim 14, wherein the base station unicasts the NBR-INF upon receiving a neighbor scanning request message.

27. The base station according to claim 14, wherein the base station unicasts the NBR-INF before the base station unicasts a neighbor scanning command, a neighbor scan response, or a handover command.

28. The base station according to claim 14, wherein the base station unicasts the NBR-INF requested by a request message.

29. The base station according to claim 14, wherein the base station receives an request message which contains a first version number of the NBR-INF and requests for an updated NBR-INF, compares the first version number with a second version number of the current NBR-INF at the base station, wherein if the base station finds a mismatch between the first version number and the second version number, then the base station decides content of the update NBR-INF and transmits the updated NBR-INF.

30. The base station according to claim 29, wherein the reduced NBR-INF contains just a version number or a limited number of candidate cells' neighboring cell information; and the updated NBR-INF contains partial NBR-INF infonnation required to be updated for a mobile station.

31. The base station according to claim 14, wherein the command event comprises at least one of the instruction to execute, response, reply, report, associated signalling or configuration.

32. A wireless communication device adapted for receiving neighbor information (NBR-INF), wherein the delivery of the NBR-INF is triggered by an event comprising at least one of a system event, a command event or a request event, the wireless communication device receives the NBR-INF, wherein the NBR-INF is delivered in a semi-periodic manner or in a non-periodic manner,
wherein in a semi-periodic NBR-INF delivery, the wireless communication device receives a reduced NBR-INF at a current time instant when there is no request for the NBR-INF provided in a period between the current time instant and a contiguously previous time instant.

33. The wireless communication device according to claim 32, wherein the system event comprises at least one of a network entry event, a network reentry event, a location update request event, or a location update command event.

34. The wireless communication device according to claim 32, wherein the request event comprises at least one of a request of the wireless communication device for NBR-INF with a valid identification, a request of the wireless communication device for NBR-INF anonymously.

35. The wireless communication device according to claim 32, wherein the NBR-INF received by the wireless communication device comprises a normal NBR-INF.

36. The wireless communication device according to claim 35, wherein the wireless communication device uses an uplink feedback channel or an uplink random access channel to request for the normal NBR-INF.

37. The wireless communication device according to claim 36, wherein the request for the normal NBR-INF made by the at least mobile station is anonymous.

38. The wireless communication device according to claim 32, wherein the wireless communication device receives the NBR-INF during a network entry procedure or a network reentry procedure.

39. The wireless communication device according to claim 32, wherein the wireless communication device receives the NBR-INF immediately after the wireless communication device completes a network entry procedure or a network reentry procedure and before any other data exchange or any other message exchange.

40. The wireless communication device according to claim 32, wherein the wireless communication device receives the NBR-INF after the wireless communication device sends a neighbor scanning request message.

41. The wireless communication device according to claim 32, wherein the wireless communication device receives the NBR-INF before receiving a neighbor scanning command, a neighbor scan response, or a handover command.

42. The wireless communication device according to claim 32, wherein the wireless communication device requests for an updated NBR-INF by sending a request message with a version number of the NBR-INF locally stored at the wireless communication device.

43. The wireless communication device according to claim 42, wherein the reduced NBR-INF contains just a version number or a limited number of candidate cells' neighboring cell information, and the update NBR-INF contains partial NBR-INF information required to be updated for the wireless communication device.

44. The wireless communication device according to claim 32, wherein the wireless communication device requests for the reduced NBR-INF by providing specific requirements in a request message.

45. The wireless communication device according to claim 32, wherein the wireless communication device requests to completely renew or partially update its own neighbor information contents.

46. The wireless communication device according to claim 32, wherein the command event comprises at least one of the instruction to execute, response, reply, report, associated signalling or configuration.

* * * * *